UNITED STATES PATENT OFFICE.

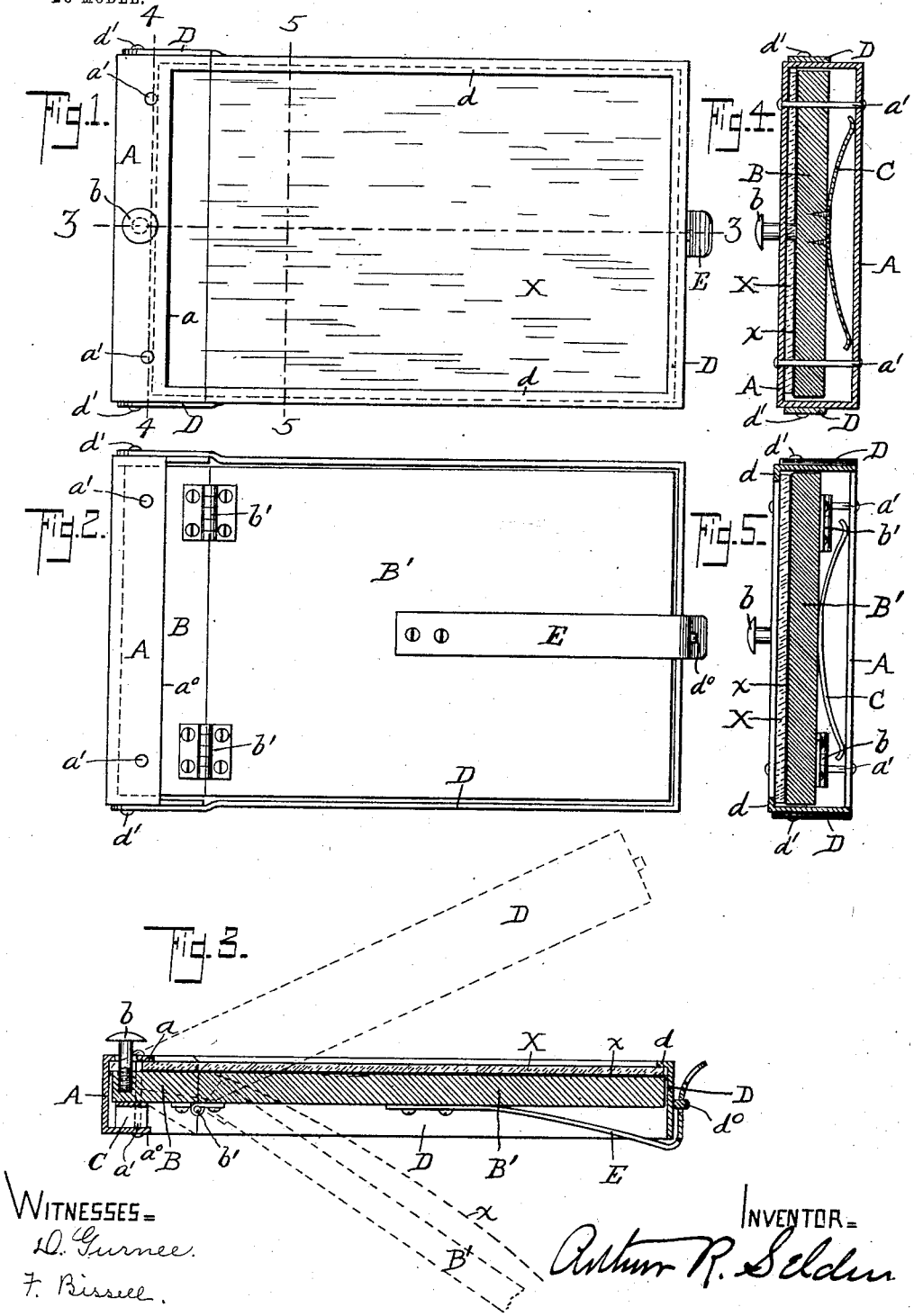

ARTHUR R. SELDEN, OF ROCHESTER, NEW YORK, ASSIGNOR OF ONE-HALF TO FRANCIS S. MACOMBER, OF ROCHESTER, NEW YORK.

PHOTOGRAPHIC-PRINTING FRAME.

SPECIFICATION forming part of Letters Patent No. 719,264, dated January 27, 1903.

Application filed April 26, 1902. Serial No. 104,896. (No model.)

*To all whom it may concern:*

Be it known that I, ARTHUR R. SELDEN, a citizen of the United States, and a resident of Rochester, in the county of Monroe and State of New York, have invented certain new and useful Improvements in Photographic-Printing Frames, of which the following is a specification.

This invention relates to photographic-printing frames; and it consists in the mechanism herein set forth and claimed.

The object of this invention is to provide a printing-frame having means for maintaining a permanent relation between the negative and the printing-paper and to provide means of easy access to the latter without disturbing said relation and also to provide means for easy and accurate adjustment of the paper and the negative, whether of glass or film, in the frame.

In the drawings, Figure 1 is a front view of a device embodying this invention. Fig. 2 is a back view of the same. Fig. 3 is a longitudinal section on the line 3 3 of Fig. 1 and shows in dotted lines positions which certain of the parts of the frame may take, and Figs. 4 and 5 are cross-sections of the respective lines 4 4 and 5 5 of Fig. 1.

Spring clamping mechanism is provided for one edge of the negative and paper, which may be operated by one hand, while the printing-paper and the negative (with a transparent glass plate when a film is used) may be handled and adjusted by the other hand, so that after the desired adjustment is obtained the spring clamping device holds the negative and the printing-paper, and thereafter independent mechanism for pressing the printing-paper against the negative is brought into operation. All the elements of the mechanism are connected, so that there are no loose parts that can be laid aside or lost. This clamping device consists of a frame-piece A, having a flange $a$ and a spring-support $a^\circ$, which may, as shown, be of metal and may be a box-like structure open on one side, in which a clamping-section B may move under the action of a spring C, so that the spring, reacting against the supporting-flange $a^\circ$, presses the clamping-section B against the glass plate X and presses said plate against the flange $a$ of the frame-piece. A push-button $b$ passes through the frame-piece and into the section B, so the latter may be moved against the force of the spring C in order to release the plate X from the clamping pressure. Pins $a'$ pass through the upper and lower flanges of the frame-piece A and through the section B in order to guide said section and to connect it permanently with the frame-piece A. Said pins also act as guides or stops for determining the position of the adjacent end of the glass plate X, as shown in Fig. 3. The back board B' is pivotally connected to the frame-piece A by hinges, such as $b'$, attached to the clamping-section B.

The frame-piece A is pivoted at $d'$ to the frame D, which has an inwardly-turned flange $d$, adapted to extend over the edge of the glass plate X, and to the back board B' is attached a spring-catch E, that is adapted to engage a projection or pin $d^\circ$ on the frame D. The frame D can be moved away from the glass plate without affecting the clamping mechanism.

On disengaging the catch E from the projection $d^\circ$ the back board B' may be swung on its hinges $b'$ to take the dotted-line position shown in Fig. 3, and the frame D may turn on its pivots $d'$ into the dotted-line position shown in the same figure. Hence the mechanism for pressing the printing-paper against the negative can be swung away from both negative and printing-paper. This moves interfering parts out of the way, so that the negative, with its piece of printing-paper, may be held in one hand, and on pressing the button $b$ the clamping-section B is moved away from the flange $a$, and the negative and printing-paper being set against the pins or stops $a'$ may be suitably adjusted, whereupon on releasing the pressure on the button $b$ the spring C causes the clamping-section B to clamp the negative and printing-paper between it and the flange $a$, and then the frame D is swung back into the full-line position shown in Fig. 3 and the back board B' is moved back to press the paper against the negative X and the catch E engages the projection $d^\circ$, thus locking the parts together. The spring-catch E is so adjusted that it maintains a constant pressure upon the back board B' when it is engaged with the projection $d^\circ$. If now it is desired to examine the print, the catch E is disengaged from its projection, the back board B' is swung open, and then the printing-paper $x$, Fig. 3, may be lifted from the negative X and may be examined; but inasmuch as the ends of the print and of the negative are still held by the clamping mechanism the paper may be returned exactly to its former position, when the printing-frame is closed again.

Of course various forms of spring-catch E may be employed and various forms of clamping device for the negative and paper.

The fact that the clamping-section B is freely movable to and from the flange $a$ under the section of the spring C makes it possible to use plates of widely-different thicknesses, and this feature, together with the employment of the spring-catch E, produces proper engagement and pressure of the printing-paper against the negative.

In case a film negative is used, the glass plate X, of clear glass, and the film is placed next against that, and behind it, against the back-board, is the printing-paper.

This device is particularly useful in connection with film negatives, (which are apt to curl and to move from position in the use of ordinary printing-frames,) while at the same time practically the whole of the print may be examined to determine the extent of the printing. Preferably all the parts of the device are permanently fastened together.

What I claim is—

1. The combination of a clamping mechanism for holding one edge of the negative and printing-paper, and connected thereto, mechanism for pressing the printing-paper against the negative and adapted to swing away in opposite directions from both faces of the negative and printing-paper, substantially as described.

2. In a printing-frame, a frame-piece at one end having a flange and spring-pressed clamping mechanism adapted to clamp one end of a plate and a piece of printing-paper between the same, a back board hinged to said clamping mechanism, a frame pivoted to said frame-piece, and adapted to swing away from the plate without affecting the clamping mechanism, and a spring-catch for making engagement between said back board and said frame and for pressing each toward the other, substantially as described.

ARTHUR R. SELDEN.

Witnesses:
F. BISSELL,
ALBERT R. PRITCHARD.